United States Patent
Tadaki et al.

(10) Patent No.: US 9,410,251 B2
(45) Date of Patent: Aug. 9, 2016

(54) RESIN-COATED ALUMINUM ALLOY SHEET AND FORMED BODY USING RESIN-COATED ALUMINUM ALLOY SHEET

(75) Inventors: Yasufumi Tadaki, Yokohama (JP); Syozo Ichinose, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 171 days.

(21) Appl. No.: 12/600,705

(22) PCT Filed: May 30, 2008

(86) PCT No.: PCT/JP2008/059977
§ 371 (c)(1), (2), (4) Date: May 24, 2010

(87) PCT Pub. No.: WO2008/149786
PCT Pub. Date: Dec. 11, 2008

(65) Prior Publication Data
US 2010/0260953 A1    Oct. 14, 2010

(30) Foreign Application Priority Data

May 31, 2007    (JP) .................. 2007-144407

(51) Int. Cl.
| | | |
|---|---|---|
| *B32B 15/08* | (2006.01) | |
| *B32B 15/09* | (2006.01) | |
| *B32B 15/20* | (2006.01) | |
| *B05C 7/00* | (2006.01) | |
| *C23C 26/02* | (2006.01) | |
| *C09D 5/08* | (2006.01) | |
| *C23C 28/00* | (2006.01) | |
| *C23C 22/34* | (2006.01) | |
| *C23C 22/83* | (2006.01) | |
| *B05D 7/00* | (2006.01) | |

(52) U.S. Cl.
CPC ............. *C23C 26/02* (2013.01); *B32B 15/08* (2013.01); *C09D 5/082* (2013.01); *C09D 5/084* (2013.01); *C23C 22/34* (2013.01); *C23C 22/83* (2013.01); *C23C 28/00* (2013.01); *B05D 7/51* (2013.01); *B05D 2202/25* (2013.01); *B05D 2701/10* (2013.01); *Y10T 428/1352* (2015.01); *Y10T 428/31678* (2015.04); *Y10T 428/31681* (2015.04)

(58) Field of Classification Search
CPC ........ C09D 5/082; C09D 5/084; B32B 15/08; C23C 22/34; C23C 22/83; C23C 26/02; C23C 28/00; Y10T 428/1352; Y10T 428/31681; Y10T 428/31678; B05D 7/51; B05D 2202/25; B05D 2701/10
USPC .................. 428/35.7, 411.1, 457–458, 472.2
See application file for complete search history.

(56) References Cited

U.S. PATENT DOCUMENTS

| | | | |
|---|---|---|---|
| 4,148,670 A | | 4/1979 | Kelly |
| 4,273,592 A | * | 6/1981 | Kelly .................... 428/472.2 |
| 4,659,395 A | * | 4/1987 | Sugama et al. ............. 428/336 |
| 4,889,718 A | * | 12/1989 | Sugama ..................... 428/343 |
| 5,174,816 A | * | 12/1992 | Aoyama et al. ............ 106/217.6 |
| 2005/0163933 A1 | * | 7/2005 | Dietsche et al. ............ 427/384 |
| 2009/0220714 A1 | * | 9/2009 | Nishida et al. ............. 428/35.7 |

FOREIGN PATENT DOCUMENTS

| | | | |
|---|---|---|---|
| EP | 1 932 944 A1 | | 6/2008 |
| JP | 56-033468 B | | 9/1982 |
| JP | 5-125555 A | | 11/1991 |
| JP | 09-111465 A | | 4/1997 |
| JP | 2000160353 a | | 6/2000 |
| JP | 2001348535 | * | 12/2001 |
| JP | 2002-275648 A | | 9/2002 |
| JP | 2004183015 A | | 7/2004 |
| WO | 2004074372 A1 | | 9/2004 |
| WO | WO 2007/029755 | * | 3/2007 |
| WO | 2008149786 | | 12/2008 |

OTHER PUBLICATIONS

English machine translation of JP 2001348535.*
Written Opinion of the International Searching Authority Form PCT/ISA/237 issued in PCT/JP2008/059977 on Dec. 1, 2009 (9 pages).

* cited by examiner

*Primary Examiner* — Yan Lan
(74) *Attorney, Agent, or Firm* — Browdy and Neimark, P.L.L.C.

(57) ABSTRACT

A resin-coated aluminum alloy sheet which has a chromium-free surface treatment layer and has a coating film formed by applying an organic resin, and which exhibits excellent adhesiveness and excellent corrosion resistance even after being subject to severe forming such as drawing is provided. A resin-coated aluminum alloy sheet includes: an aluminum substrate having a surface treatment film on at least one surface thereof; and an organic resin film layer formed on the surface of the aluminum substrate. The surface treatment film includes 2 mg/m² to 100 mg/m² of zirconium in terms of metal atoms and at least any one of a polyitaconic acid, monosaccharide alcohol and disaccharide alcohol as an aluminum-ion-trapping agent.

16 Claims, No Drawings ical field

The present invention relates to a resin-coated aluminum alloy sheet which is manufactured by forming a surface treatment film on at least one side of an aluminum substrate and by forming an organic resin film layer on the surface of the aluminum substrate, and more particularly to a resin-coated aluminum alloy sheet having excellent corrosion resistance and excellent adhesiveness in which a surface treatment film which contains zirconium and at least any one of a polyitaconic acid, monosaccharide alcohol and disaccharide alcohol as an aluminum-ion-trapping agent is formed on a surface of the aluminum substrate and the surface treatment film is coated with an organic resin film layer.

BACKGROUND ART

In manufacturing formed bodies such as can bodies or can lids used as beverage cans or the like, an aluminum sheet or an aluminum alloy sheet is used. Although aluminum exhibits excellent formability and excellent flavor keeping property as a can body material and can lid material, aluminum has a drawback that aluminum exhibits less corrosion resistance compared to a surface-treated steel material.

On the other hand, a chromate-based chemical conversion treatment agent has been used for applying surface treatment to the aluminum sheet. A chromium-based chemical conversion coating film formed on the aluminum sheet by the chromium-based chemical conversion treatment agent exhibits the excellent corrosion resistance even when used alone and also exhibits excellent corrosion resistance and adhesiveness even after various resin-based coating materials are applied to the chromium-based chemical conversion coating film. Accordingly, the chromium-based chemical conversion coating film has been used in broad applications including architectural materials, electrical appliance for household use, fin materials, vehicle-use evaporators and beverage can materials (see patent document 1).

However, the chromium-based chemical conversion treatment agent uses chromium metal which is harmful to humans in a surface treatment liquid and hence, recently, from a viewpoint of protection of environment, the use of chemical conversion treatment agent has difficulty in operability and a waste liquid produced after treatment. Accordingly, there has been a demand for a non-chromium surface treatment agent which can impart corrosion resistance and adhesiveness equal to or higher than corrosion resistance and adhesiveness brought about by the chromium-based surface treatment agent to the aluminum sheet.

With respect to the non-chromium surface treatment agent, for example, patent document 2 discloses an aluminum-use surface treatment agent containing zirconium and/or titanium, phosphate and a fluoric material.

Further, patent document 3 discloses a metal surface treatment agent containing a water-soluble zirconium compound, a water-soluble or water-dispersing acrylic resin, and a water-soluble or water-dispersing thermosetting cross-linking material. The content of the water-soluble zirconium compound is 500 to 15000 ppm on the basis of mass as zirconium, and the content of acrylic resin is 150 to 740 mgKOH/g in solid content acid value and 24 to 240 in solid content hydroxyl value and is 500 to 30000 ppm on the basis of mass as the solid content. The content of the thermosetting type crosslinking agent is 125 to 7500 ppm on the basis of mass as the solid content.

Further, in the chemical conversion treatment which contains an organic material in the chemical conversion compound disclosed in patent document 3, although adhesiveness between the aluminum substrate and the organic resin is enhanced, there may be case where a sludge derived from the organic material and aluminum ions are generated during the continuous treatment and this sludge gives rise to a drawback that the adhesiveness is deteriorated after coating organic resin or after formation of a formed body.

Further, in patent document 4, sorbitol is exemplified as an aluminum ion sequestering agent. A treatment liquid which contains the aluminum ion sequestering agent is an aqueous alkaline cleaning liquid before the chemical conversion treatment and is not a chemical conversion treatment liquid. Further, sorbitol is provided for sequestering aluminum ions generated by etching and hence, the technical concept disclosed in patent document 4 differs from the technical concept of the present invention.

[Patent document 1] JP-A-5-125555
[Patent document 2] JP-B-56-33468
[Patent document 3] JP-A-2002-275648
[Patent document 4] JP-A-9-111465

DISCLOSURE OF THE INVENTION

The present invention has been made to overcome these drawbacks which the prior art possesses. To be more specific, it is an object of the present invention to provide a resin-coated aluminum alloy sheet which has a chromium-free surface treatment layer and a coating film formed by applying a coating material or an organic resin, and which exhibits excellent corrosion resistance even after being subject to severe forming such as drawing, deep drawing, drawing and ironing, or stretch drawing after the formation of an organic resin film layer. Further, even when the resin-coated aluminum alloy sheet is formed into a formed body such as a can body or a can lid, the resin-coated aluminum alloy sheet can exhibit excellent adhesiveness between an aluminum substrate and the coating film or the organic resin film layer and can exhibit the excellent corrosion resistance.

It is another object of the present invention to provide a formed body which is formed of a resin-coated aluminum alloy sheet which has a chromium-free surface treatment layer and a coating film formed by applying coating material or an organic resin, and which exhibits favorable corrosion resistance even after being subject to severe forming after forming the coating film, and excellent adhesiveness between the aluminum substrate and the coating film or the organic resin film at the time of forming the formed body.

MEANS FOR OVERCOMING DRAWBACKS (1) A resin-coated aluminum alloy sheet of the present invention includes: an aluminum substrate having a surface treatment film on at least one side thereof; and an organic resin film layer formed on the surface of the aluminum substrate, wherein the surface treatment film includes 2 mg/m$^2$ to 100 mg/m$^2$ of zirconium in terms of metal atoms and at least one of a group consisting of a polyitaconic acid, monosaccharide alcohol and disaccharide alcohol as an aluminum-ion-trapping agent.

(2) The resin-coated aluminum alloy sheet of the present invention having the above-mentioned constitution (1) is characterized in that monosaccharide alcohol is sorbitol.

(3) The resin-coated aluminum alloy sheet of the present invention having the above-mentioned constitution (1) or (2) is characterized in that the monosaccharide alcohol is maltitol.

(4) The resin-coated aluminum alloy sheet of the present invention having any one of the above-mentioned constitutions (1) to (3) is characterized in that the surface treatment film is a film which contains 0.5 to 20 mg/m$^2$ of aluminum-ion-trapping agent in terms of organic carbon content derived from the aluminum-ion-trapping agent.

(5) The resin-coated aluminum alloy sheet of the present invention having any one of the above-mentioned constitutions (1) to (4) is characterized in that the organic resin film layer is a thermoplastic resin film layer.

(6) The resin-coated aluminum alloy sheet of the present invention having any one of the above-mentioned constitutions (1) to (4) is characterized in that the organic resin film layer is a coating film.

(7) The resin-coated aluminum alloy sheet of the present invention having any one of the above-mentioned constitutions (1) to (4) is characterized in that the organic resin film layer is a thermoplastic resin film layer which is adhered to the surface of the aluminum substrate by way of an adhesion primer.

(8) The resin-coated aluminum alloy sheet of the present invention having the above-mentioned constitution (5) or (7) is characterized in that the thermoplastic resin film layer is a polyester film layer.

(9) A formed body of the present invention is characterized by being formed using the resin-coated aluminum alloy sheet having any one of constitutions (1) to (8).

(10) The formed body of the present invention having the constitution (9) is characterized in that the formed body is a can lid.

(11) The formed body of the present invention having the constitution (9) is characterized in that the formed body is a can body.

ADVANTAGES OF THE INVENTION

The resin-coated aluminum alloy sheet of the present invention exhibits excellent adhesiveness and excellent corrosion resistance of resin even when the resin-coated aluminum alloy sheet is formed into a formed body such as a can body or a can lid by applying severe forming such as drawing, deep drawing, drawing and ironing or stretch drawing to the resin-coated aluminum alloy sheet, and possesses performances equal to or more than performances obtained by a conventional phosphoric chromate treatment agent.

BEST MODE FOR CARRYING OUT THE INVENTION

The resin-coated aluminum alloy sheet of the present invention includes a surface treatment film on at least one side of an aluminum substrate, and the surface treatment film contains one or more 2 mg/m$^2$ to 100 mg/m$^2$ of zirconium in terms of metal atoms and at least one of a polyitaconic acid, monosaccharide alcohol and disaccharide alcohol as an aluminum-ion-trapping agent. The surface treatment film is formed such that a surface treatment film constituted of an aluminum compound and a zirconium compound is formed on the surface of the aluminum substrate using a metal surface treatment composition described later, the aluminum ion trapping agent is simultaneously precipitated so as to form a film. Hereinafter, embodiments of the resin-coated aluminum alloy sheet of the present invention and a formed body formed using the resin-coated aluminum alloy sheet are explained sequentially.

(Aluminum Substrate)

The aluminum substrate which becomes a base of the resin-coated aluminum alloy sheet may preferably have the following composition, for example. That is, in terms of % by mass, the aluminum substrate contains 0.2 to 5.5% by mass of Mg, 0.05 to 1% by mass of Si, 0.05 to 1% by mass of Fe, 0.01 to 0.35% by mass of Cu, 0.01 to 2% by mass of Mn, and 0.01 to 0.4% by mass of Cr. The percentage of the above-mentioned composition is set due to the following reasons.

Mg is added to enhance strength of the aluminum substrate. The reason that the content of Mg is limited to 0.2 to 5.5% by mass is that the desired strength cannot be obtained when the content of Mg is less than 0.2% by mass, and edge cracks are increased at the time of rolling when the content of Mg exceeds 5.5% by mass.

Si and Fe are added to improve the formability. The reason that the content of Si is limited to 0.05 to 1% by mass and the content of Fe is limited to 0.05 to 1% by mass is as follows. That is, both components are unavoidably included as components of the aluminum substrate so that it is difficult to restrict the content of Si and the content of Fe to less than 0.05% by mass using usual treatment, while when the content of Si or Fe exceeds 1% by mass, macro crystals is liable to be easily generated in the formability and hence, the formability is deteriorated.

Cu is added to increase the strength of the aluminum substrate. The reason that the content of Cu is limited to 0.01 to 0.35% by mass is that the strength becomes poor when Cu is not added and cracks occur at the time of casting when the content of Cu exceeds an upper limit.

Mn and Cr are added to increase strength and heat resistance. Mn and Cr are added also to enhance a limit drawing ratio and to form crystal particles into microstructure. The reason that the content of Mn is set to 0.01 to 2% by mass and the content of Cr is set to 0.01 to 0.4% by mass is that when the contents of Mn and Cr are less than lower limits, the above-mentioned advantageous effects are small, while when the contents of Mn and Cr exceeds upper limits, the limit drawing ratio is decreased thus giving rise to the occurrence of cracks in a can manufacturing step and a can lid manufacturing step.

In the present invention, it is preferable to use the aluminum substrate having a thickness of 0.15 to 0.40 mm, and more preferably the aluminum substrate having a thickness of 0.20 to 0.30 mm. The reason is as follows. When the thickness of the aluminum substrate is less than 0.15 mm, the can or the can lid cannot be easily formed and, at the same time, cannot acquire desired strength. On the other hand, when the thickness of the aluminum substrate exceeds 0.40 mm, the manufacture of the can or the can lid is deteriorated economically.

As the above-mentioned aluminum substrate, specifically, an aluminum sheet, an aluminum-copper alloy sheet, an aluminum-manganese alloy sheet, an aluminum-silicon alloy sheet, an aluminum-magnesium alloy sheet, an aluminum-magnesium-silicon alloy sheet, an aluminum-zinc alloy sheet, an aluminum-zinc-magnesium alloy sheet and the like are named.

As the above-mentioned aluminum substrate, for example, an aluminum alloy material JIS A5182, an aluminum alloy material JIS A5082, an aluminum alloy material JIS A5021, an aluminum alloy material JIS A5022, an aluminum alloy material JIS A5052, an aluminum alloy material JIS A3004, an aluminum alloy material JIS A3005, an aluminum alloy material JIS A3104 or the like are preferably used.

Also as the above-mentioned aluminum substrate, it is possible to use a clad material which is formed of a core material made of one of the above-mentioned aluminum alloys and a clad material which is formed of a core material having a pure aluminum layer having aluminum purity of 99.5% or more. Further, it is also possible to use a pure aluminum plate having aluminum purity of 99.5% or more.

Although a shape of the aluminum substrate is not particularly limited, the shape of the aluminum substrate is preferably formed into a shape which facilitates the lamination of a film. For example, the aluminum substrate may preferably be formed into a plate shape, a sheet shape or a coil shape.

(Manufacture of Resin-Coated Aluminum Alloy Sheet)

In forming a formed body such as a resin-coated aluminum can or a resin-coated aluminum can lid, firstly, the surface-treated aluminum sheet in which the aluminum substrate is covered with the metal surface treatment film is manufactured. Then, the resin-coated aluminum alloy sheet in which a surface of the surface-treated aluminum substrate is coated with the organic resin layer is manufactured. Hereinafter, specific steps of the manufacturing method are explained.

(Surface Treatment of Aluminum Substrate)

Prior to the manufacture of a surface-treated aluminum substrate, first of all, rolling-use oil, rust prevention oil and the like are removed (degreased) by cleaning a surface of the aluminum substrate. A degreasing method is not particularly limited, and may adopt solvent degreasing, alkali degreasing or acidic degreasing used in general.

For example, it is preferable to perform a step in which the aluminum substrate is cleaned with an acid. Further, prior to the above-mentioned acid-cleaning step, it is preferable to perform a step in which the aluminum substrate is cleaned with alkali. The preferable mode is a method which sequentially performs the respective steps in order of alkali cleaning, water cleaning, acid cleaning, water cleaning, surface treatment, water cleaning, pure water cleaning and drying.

The above-mentioned alkali cleaning treatment is not particularly limited. For example, it is possible to perform conventional treatments which are used for alkali cleaning treatment of metal such as aluminum or aluminum alloy. Usually, in the alkali cleaning treatment, the alkali cleaning is performed using an alkaline cleaner. Further, the acid cleaning is performed using an acid cleaner.

The alkaline cleaner and the acid cleaner are not particularly limited, and an alkaline cleaner and an acid cleaner which are used in usual cleaning can be used.

Usually, it is preferable to perform the above-mentioned acid cleaning and the above-mentioned alkali cleaning treatment by a spray method. After performing the above-mentioned acid cleaning or alkali cleaning, for removing the acid cleaning agent or the alkali cleaning agent remaining on a surface of a base material, water cleaning treatment is performed.

As the surface treatment applied to the aluminum substrate, a surface treatment film can be formed by bringing the metal surface treatment composition described later into contact with the surface of the aluminum substrate thus making the metal surface treatment composition react with the surface of the aluminum substrate. The method of treating the aluminum substrate is not particularly limited. That is, any method can be used provided that the method can bring the aluminum substrate with the metal surface treatment composition into contact. For example, a usual method such as a spray method or an immersion method can be named, for example. It is particularly preferable to use the spray method.

(Formation of Surface Treatment Film)

The surface treatment film is formed on the surface of the aluminum substrate using the metal surface treatment composition containing a predetermined quantity of fluorine ions, a predetermined quantity of zirconium ions, a predetermined amount of aluminum ions, and an aluminum ion trapping agent. By treating the surface of the aluminum substrate using this metal surface treatment composition, as is well-known to those who are skilled in the art, aluminum is dissolved by fluorine ions and, eventually, pH of the metal surface treatment composition is increased leading to the precipitation of zirconium compound.

It is considered that aluminum compound is precipitated simultaneously with the precipitation of zirconium compound so that the surface treatment film formed of zirconium compound and aluminum compound is formed. To consider the reason why the resin-coated aluminum alloy substrate of the present invention can acquire the excellent adhesiveness and the excellent corrosion resistance, the above-mentioned aluminum ion trapping agent is simultaneously precipitated and is present in the vicinity of the surface of the above-mentioned surface treatment film.

On the other hand, usually, the aluminum substrate is etched by fluorine ions. In this case, it is well-known that aluminum ions are supplied to a treatment bath and produces aluminum sludge. Here, with the use of the above-mentioned metal surface treatment composition, it is possible to largely suppress the generation of aluminum sludge.

It is considered that a certain interaction exists between the aluminum ion trapping agent and aluminum ions in the above-mentioned metal surface treatment composition, and aluminum ions are stabilized in the treatment bath due to such an interaction.

When a large quantity of aluminum sludge is generated, the sludge is entangled into the surface treatment film and hence, a thickness of the surface treatment film is partially increased thus deteriorating adhesiveness and forming adhesiveness after coating with an organic resin.

This is particularly apparent when a coiled sheet-shaped aluminum sheet is subject to continuous surface treatment. That is, to consider a case where a large quantity of sludge is generated in a surface treatment liquid, the sludge is adhered to and accumulated on a surface of a surface treatment liquid removing roll at the time of removing a surface treatment liquid with such a roll, and the accumulated sludge is transferred to the surface of the aluminum sheet thus further increasing the surface film irregularities.

The manufacturing method of the metal surface treatment composition is not particularly limited, and the metal surface treatment composition is prepared by blending fluorine ions, zirconium ions, aluminum ions and an aluminum ion trapping agent described below and, thereafter, by adjusting pH of the metal surface treatment composition. Hereinafter, the constitution of the metal surface treatment composition is explained.

(Fluorine Ions)

It is preferable that the above-mentioned metal surface treatment composition contains not less than 1 ppm and not more than 1000 ppm of fluorine ions in terms of effective fluorine ion content, and it is more preferable that the above-mentioned metal surface treatment composition contains not less than 5 ppm and not more than 100 ppm of fluorine ions in terms of effective fluorine ion content. Here, "effective fluorine ion content" implies the concentration of fluorine ions in a free state in a treatment bath, and is obtained by measuring the treatment bath by a measuring instrument having a fluorine ion electrode. When the effective fluorine ion content is less than 1 ppm, etching becomes insufficient so that a sufficient zirconium film quantity cannot be obtained and hence, the adhesiveness and the corrosion resistance are lowered. When the effective fluorine ion content is more than 1000 ppm, etching is excessive so that the zirconium film is not precipitated and hence, the adhesiveness and the corrosion resistance are lowered. As a fluorine ion source, besides zirconium fluoride acid compound, it is possible to name a hydrofluoric acid, fluoric ammonium, hydrofluoric acid ammonium, sodium fluoride, hydrofluoric acid sodium or the like. The effective fluorine ion concentration can be adjusted by using these fluorine ion sources in combination.

(Zirconium Ions)

It is preferable that the content of zirconium ions in the above-mentioned metal surface treatment composition is not less than 10 ppm and not more than 10000 ppm, and it is more preferable that the content of zirconium ions in the above-mentioned metal surface treatment composition is not less than 50 ppm and not more than 1000 ppm. When the content of zirconium ions is less than 10 ppm, the zirconium content in the metal treatment film is small and hence, corrosion resistance is lowered. When the content of zirconium ions in the metal surface treatment composition is larger than 10000 ppm, the further improvement of properties of the resin-coated aluminum alloy sheet is no more expected and hence, it becomes disadvantageous in terms of a cost. As a zirconium ion source, a fluoro zirconic acid, a salt of lithium, sodium, potassium, ammonium, zirconium fluoride or the like are named. Further, a zirconium ion source can be obtained by dissolving zirconium compound such as zirconium oxide into a fluoride aqueous solution such as hydrofluoric acid.

(Aluminum Ions)

It is preferable that the content of aluminum ions in the above-mentioned metal surface treatment composition is not less than 10 ppm and not more than 2000 ppm, and it is more preferable that the content of aluminum ions in the above-mentioned metal surface treatment composition is not less than 50 ppm and not more than 500 ppm. When the content of aluminum ions is smaller than 10 ppm, the metal treatment film which exhibits excellent adhesiveness cannot be obtained. When the content of aluminum ions is larger than 2000 ppm, a quantity of an aluminum ion trapping agent becomes relatively insufficient and hence, there exists a possibility that a component balance of the metal surface treatment composition collapses so that a large quantity of sludge is generated.

As an aluminum ion source, aluminate such as aluminum hydroxide, aluminumfluoride, aluminumoxide, aluminumsulfate, aluminum nitrate, aluminum silicate or sodium aluminate, or fluoro aluminum such as fluoro aluminum acid sodium or the like are named. Further, the aluminum ion source may be supplied through the surface treatment of aluminum-based metal.

(Aluminum Ion Trapping Agent)

The aluminum ion trapping agent contained in the above-mentioned metal surface treatment composition is provided for, as described previously, enhancing stability of the metal surface treatment composition liquid thus suppressing the generation of sludge by causing a certain interaction between the aluminum ion trapping agent and aluminum ions. Further, a portion of the aluminum ion trapping agent is bonded to zirconium ions in the metal surface treatment composition and is precipitated also on a surface of the aluminum substrate thus also giving rise to an advantageous effect that the adhesiveness between the aluminum substrate and the organic resin is enhanced.

As the aluminum ion trapping agent, a polyitaconic acid, monosaccharide alcohol or disaccharide alcohol are named.

It is preferable that the content of the aluminum ion trapping agent in the above-mentioned metal surface treatment composition is not less than 50 ppm and not more than 10000 ppm, and it is more preferable that the content of aluminum ion trapping agent in the above-mentioned metal surface treatment composition is not less than 100 ppm and not more than 1000 ppm. When the content of aluminum ion trapping agent is less than 50 ppm, the content of organic complex compound formed by the aluminum ions in the surface treatment film and the aluminum ion trapping agent is small and hence, the adhesiveness is lowered. When the content of the aluminum ion trapping agent is more than 10000 ppm, the further enhancement of properties of the resin-coated aluminum alloy sheet cannot be expected, and it becomes disadvantageous in terms of a cost. When two or more kinds of aluminum ion trapping agents are used, a total amount of these aluminum ion trapping agents becomes the content of the aluminum ion trapping agent.

(Polyitaconic Acid)

As a specific example of polyitaconic acid which is used as the aluminum ion trapping agent, besides the polyitaconic acid per se, an alkali metal salt or an ammonium salt of polyitaconic acid are named. Further, as the specific examples of polyitaconic acid, polyitaconic acid copolymer having itaconic acid segments such as polyitaconic acid-polymaleic acid copolymer, polyitaconic acid-(metha)acrylic acid copolymer or polyitaconic acid-sulfonic acid copolymer, and an alkali metal salt or an ammonium salt of these copolymers can be also used. Homopolymer of polyitaconic acid is preferable. Molecular weights of the above-mentioned polyitaconic acids are, for example, 260 to 1000000, and more preferably 1000 to 70000.

When the polyitaconic acid is copolymer, the content of itaconic acid segments in the copolymer is assumed as an effective component which functions as the aluminum ion trapping agent. For example, when the above-mentioned metal surface treatment composition contains 200 ppm of polyitaconic acid-polymaleic acid copolymer, and a mass ratio of itaconic acid and maleic acid in the copolymer is 1/1, the content of the aluminum ion trapping agent is assumed to be 100 ppm (200 ppm×½=100 ppm).

When the polyitaconic acid is copolymer, it is preferable that the content of itaconic acid segments in the copolymer is 10% by mass or more, and it is more preferable that the content of itaconic acid segments in the copolymer is 50% by mass or more. An acrylic resin which does not contain itaconic acid segments such as polyacrylic acid, polymethacrylic acid, for example and acrylic copolymer which does not contain an itaconic acid cannot acquire advantageous effects of the present invention.

(Monosaccharide Alcohol)

As a specific example of monosaccharide alcohol which functions as the aluminum ion trapping agent, sorbitol, mannitol, galactitol, xylitol or the like are named. Among these monosaccharide alcohols, it is particularly preferable to use sorbitol since the advantageous effects of the present invention can be easily acquired with the use of sorbitol.

(Disaccharide Alcohol)

As a specific example of disaccharide alcohol which functions as the aluminum ion trapping agent, maltitol, lactitol or the like are named. Among these disaccharide alcohols, it is particularly preferable to use maltitol since the advantageous effects of the present invention can be easily acquired with the use of maltitol.

(pH)

It is preferable that the pH of the above-mentioned metal surface treatment composition is not less than 2 and not more than 5. It is more preferable that the pH of the above-mentioned metal surface treatment composition is not less than 3 and not more than 4.5. When the pH of the above-mentioned metal surface treatment composition is less than 2, etching becomes excessive, while when the pH of the above-mentioned metal surface treatment composition is more than 5, etching becomes insufficient and, at the same time, the metal surface treatment composition becomes unstable. The adjustment of the pH of the metal surface treatment composition is performed such that nitric acid is added when the pH is high, while ammonium, sodium hydrate, potassium hydrate or the like is added when the pH is low.

(Additives)

Predetermined amounts of various additives may be added to the above-mentioned metal surface treatment composition within ranges that the advantageous effects of the present invention are not impaired. For example, in addition to metal ions such as manganese ions, zinc ions, calcium ions, iron ions, magnesium ions, molybdenum ions, vanadium ions, titanium ions, silicon ions, a surfactant, a citric acid, a gluconic acid, a malonic acid, a succinic acid, a tartaric acid, a phosphonic acid or the like, or a metal salt of these materials may be added.

(Surface-Treated Aluminum Sheet)

The surface-treated aluminum sheet is obtained by treating an aluminum substrate with the above-mentioned metal surface treatment composition. In this case, by bringing the above-mentioned metal surface treatment composition into contact with at least one surface of the aluminum substrate, the surface-treated aluminum sheet can be obtained. The surface treatment film present on the surface of the surface-treated aluminum sheet contains 2 to 100 mg/m$^2$ of zirconium in terms of metal atoms, and at least one selected from a group consisting of a polyitaconic acid, monosaccharide alcohol and disaccharide alcohol as an aluminum-ion-trapping agent.

(Film Forming Condition)

With respect to a liquid temperature for forming the surface treatment film on the aluminum substrate using the above-mentioned metal surface treatment composition, it is preferable to set the temperature to a value which falls within a temperature range having a lower limit of 30° C. and an upper limit of 70° C. It is more preferable to set the temperature of the surface treatment liquid to a value which falls within a temperature range from 40° C. to 60° C. When the liquid temperature is lower than 30° C., a reaction speed is lowered so that a film forming reaction becomes slow whereby it is necessary to prolong a treatment time for obtaining a sufficient film quantity leading to lowering of productivity. On the other hand, when the liquid temperature exceeds 70° C., stability of the aluminum ion trapping agent is lowered.

Further, it is preferable to set the treatment time to not less than 1 second and not more than 60 seconds. When the treatment time is less than 1 second, the film forming reaction time is insufficient so that a proper surface treatment film cannot be formed, while when the film forming reaction time exceeds 60 seconds, the treatment time is prolonged so that the manufacture of the resin-coated aluminum alloy sheet becomes disadvantageous industrially.

The aluminum substrate on which the surface treatment film is formed due to the above-mentioned contact between the aluminum substrate and the metal surface treatment composition is cleaned with water for removing the metal surface treatment composition remaining on the surface of the aluminum substrate. Water such as service water or industry-use water can be used as water for cleaning the surface of the aluminum substrate. It is preferable to set a temperature of water for such cleaning to a value which falls within a temperature range having a lower limit of 5° C. and an upper limit of 80° C. It is more preferable to set such water temperature to 20° C. to 70° C. It is preferable to set water cleaning time to 2 seconds to 60 seconds. After cleaning the surface of the aluminum substrate with water, it is preferable to clean the surface of the aluminum substrate using pure water such as ion-exchange water or distilled water for preventing components contained in cleaning water such as calcium, iron, chlorine and the like from remaining on the surface of the aluminum substrate. It is preferable to set a temperature of pure water for such cleaning to a value which falls within a temperature range having a lower limit of 5° C. and an upper limit of 80° C. It is more preferable to set the temperature of pure water to 20° C. to 70° C. It is more preferable to set the water cleaning time to 1 second to 20 seconds.

It is preferable to dry the surface treatment film after water cleaning. As a method for drying the above-mentioned film, drying by heating may preferably be used. For example, drying by heating may be performed by an oven and/or the forced circulation of hot air. The drying by heating is performed at a temperature of 40 to 100° C. for 1 to 60 seconds.

(Metal Surface Treatment Film)

It is necessary to set a film quantity of the surface treatment film formed on the aluminum substrate using the above-mentioned metal surface treatment composition to a value not less than 2 mg/m$^2$ and 100 mg/m$^2$ in terms of metal atoms. It is more preferable to set the film quantity of the surface treatment film to not less than 10 mg/m$^2$ and not more than 25 mg/m$^2$. When the film quantity of the surface treatment film is less than 2 mg/m$^2$, the resin-coated aluminum alloy sheet cannot acquire proper corrosion resistance, while when the film quantity of the surface treatment film exceeds 100 mg/m$^2$, the cohesive failure by forming is liable to occur thus giving rise to a possibility that the adhesiveness and the durability are lowered.

(Conversion of Organic Carbon Content)

It is preferable that the content of the aluminum ion trapping agent contained in the surface treatment film of the present invention is not less than 0.5 mg/m$^2$ and not more than 20 mg/m$^2$ in terms of organic carbon content derived from the aluminum ion trapping agent. It is more preferable that the content of the aluminum ion trapping agent in the surface treatment film of the present invention is not less than 1 mg/m$^2$ and not more than 10 mg/m$^2$ in terms of organic carbon content derived from the aluminum ion trapping agent. When the content of the aluminum ion trapping agent is less than 0.5 mg/m$^2$, the resin-coated aluminum alloy sheet cannot acquire proper adhesiveness, while when the content of the aluminum ion trapping agent exceeds 20 mg/m$^2$, there is a possibility that the adhesiveness is lowered attributed to the cohesive failure in the film.

With respect to a thickness of the surface treatment film layer, it is preferable to set the film thickness to a value which falls within a range from 1 to 100 nm, and more preferably to a value which falls within a range from 3 to 50 nm. When the film thickness is less than 1 nm, the surface treatment film layer cannot acquire excellent adhesiveness between the aluminum substrate and the organic resin film which is formed on the upper layer of the surface treatment film layer, while when the film thickness exceeds 100 nm, the cohesive failure occurs in the film and hence, there is a possibility that the adhesiveness is lowered.

The adhesion quantity of the zirconium compound in the above-mentioned surface treatment film can be determined using a commercially-available X-ray fluorescence analyzer. That is, a plurality of samples whose adhesion quantities of zirconium are known and differ from each other in adhesion quantity are measured, and a calibration curve of strength-adhesion quantity is obtained based on measured strengths.

Under the similar conditions, a sample is cut out from a resin-coated aluminum alloy sheet of the present invention, and the strength of the sample is measured. By converting the measured strength into the adhesion quantity based on the calibration curve, the adhesion quantity of the zirconium compound can be measured.

The adhesion quantity of the aluminum ion trapping agent in the surface treatment film can be measured as organic carbon content derived from the aluminum ion trapping agent using a total organic carbon measuring device. The sample is a disc having a diameter of 40 mm and the measuring condition is at 450° C. for 5 minutes.

The film thickness of the surface treatment film can be determined using a commercially available XPS (X-ray photoelectron spectroscopy analysis) equipment using an ordinary method.

(Formation of Organic Resin Film Layer)

After the surface treatment is performed using the metal surface treatment composition, an organic resin film layer is further formed on a surface of the surface treatment film. The organic resin film layer may be formed of a thermoplastic resin or a coating film corresponding to an object of the formed body or the application of the formed body.

(Coating Film, Formation of Coating Film)

When the formed body is a can lid, a coating film is preferably applied to the surface-treatment layer or a thermoplastic resin coating is preferably applied to the surface-treatment layer by way of an adhesion primer.

Further, in forming the formed body such as a can body by press forming, when the degree of forming is small as in the case of a drawn can or a DR can, coating of a coating film, thermoplastic resin coating by way of an adhesion primer, or direct thermoplastic resin coating is applied to the surface-treatment layer, while when the degree of forming is large as in the case of deep drawing, drawing and ironing or stretch drawing, thermoplastic resin coating by way of an adhesion primer or direct thermoplastic resin coating is applied to the surface-treatment layer.

As the coating film, a thermosetting resin coating material such as a phenol-formaldehyde resin, a furan-formaldehyde resin, a xylene-formaldehyde resin, a ketone-formaldehyde resin, a urea formaldehyde resin, a melamine-formaldehyde resin, an alkyd resin, an unsaturated polyester resin, an epoxy resin, a bismaleimide resin, a triaryl cyanurate resin, a thermosetting acrylic resin, a silicone resin, or an oiliness resin, for example, or a thermoplastic resin coating material such as a vinyl chloride-vinyl acetate copolymer, a partially saponificated product of the vinyl chloride-vinyl acetate copolymer, a vinyl chloride-maleic acid copolymer, a vinyl chloride-maleic acid-vinyl acetate copolymer, an acrylic polymer or saturated polyester resin can be named. These resin coating materials may be used in a single form or in combination of two or more kinds of the coating materials. Among these resin coating materials, an epoxy acrylic coating material, an epoxy phenolic coating material, a polyester-based coating material, an epoxy urea-based coating material, a vinyl organosol-based coating material or the like can be particularly preferably used.

A favorable dry-coating film mass of the coating film made of an epoxy acrylic coating material, an epoxy phenolic coating material, a polyester-based coating material, an epoxy urea-based coating material and a vinyl organosol-based coating material is described hereinafter. The dry-coating film mass of the epoxy acrylic coating material is preferably 10 to 160 mg/dm$^2$. The dry-coating film mass of the coating film made of the epoxy phenol coating material and the polyester-based coating material is preferably 30 to 140 mg/dm$^2$. The dry-coating film mass of the coating film made of the epoxy urea-based coating material is preferably 30 to 70 mg/dm$^2$. The dry-coating film mass of the coating film made of the vinyl organosol-based coating material is preferably 30 to 160 mg/dm$^2$.

As the above-mentioned adhesion primer layer, an epoxy phenol resin, an epoxy acrylic resin, a polyester phenolic resin, a polyester amino resin, a polyester urethane resin or the like can be named. The adhesion primer coating exhibits excellent adhesiveness for both of a metal material and a film.

As the epoxyphenol resin-based adhesion primer, a coating material containing a phenol resin and an epoxy resin at a mass ratio of 50:50 to 1:99, particularly at a mass ratio of 40:60 to 5:95 is preferable since the coating material exhibits both excellent adhesiveness and excellent corrosion resistance. The adhesion primer layer may preferably have a thickness of 0.01 to 10 μm in general. The adhesion primer layer may be preliminarily formed on the aluminum substrate or on the above-mentioned polyester film.

The above-mentioned coating film or adhesion primer layer is applied to a surface-treatment layer using a method such as roller coating, blade coating or spray coating. The coating film is baked by a hot-air oven, an infrared heating furnace or the like so that the coating film can be used as a material for forming the formed body such as a can lid.

(Thermoplastic Resin Film Layer)

As the organic resin film which is applied to the adhesion primer or is directly applied to the surface-treatment layer, a thermoplastic resin can be named.

The organic resin film made of thermoplastic resin is not particularly limited, and for example, the organic resin film may be a plastic film made of a thermoplastic resin, wherein as the thermoplastic resin, such as polyolefin such as crystallinity polypropylene, crystallinity propylene-ethylene copolymer, crystallinity polybutene-1, crystallinity poly4-methyl pentene-1, low density polyethylene, medium density polyethylene or high density polyethylene, ethylene-vinyl acetate copolymer (EVA), ethylene-ethyl acrylate copolymer (EEA), or ion cross-link olefin copolymer(ionomer); aromatic vinyl copolymer such as polystyrene, or styrene-butadiene copolymer; vinyl halide polymer such as polyvinylchloride, or vinylide chloride resin; nitrile polymer such as acrylonitrile-styrene copolymer, or acrylonitrile-styrene-butadiene copolymer; polyamide such as nyron6, nyron66, or para or metha xylylene adipamido; polyester such as polyethylene terephthalate (PET), or poly tetramethylene terephthalate, polycarbonate; polyacetal such as polyoxymethylene are named.

Among various thermoplastic resins, a polyester-based resin or a polyolefin-based resin can be preferably used.

As the polyester-based resin, thermoplastic polyesters such as polyethylene terephthalate, polybutylene terephthalate, or polynaphthalene terephthalate can be used.

As the preferable polyester, polyethylene terephthalate (PET) can be named. However, provided that essential properties of polyethylene terephthalate are not deteriorated, it is possible to use co-polyester which contains other polyester units while containing an ethylene terephthalate unit as a main component.

As a copolymer component for forming such co-polyester, it is possible to name a dicarboxylic acid component such as isophthalic acid, p-β-oxyethoxy benzoic acid, naphthalene2, 6-dicarboxylic acid, diphenoxy ethane-4,4'-dicarboxylic acid, 5-sodium sulfo isophthalic acid, adipic acid, sebacic acid or an alkyl ester derivative of these components, or a glycol component such as propylene glycol, 1,4-butanediol, neopentylglycol, 1,6-hexylene glycol, cyclohexane di-methanol, ethylene oxide adduct of bisphenol A, diethylene glycol, or triethyleneglycol.

As the thermoplastic resin, a co-polymer thermoplastic polyester-based resin containing two or more kinds of the above-mentioned constitutional units or a blended product of two or more kinds of thermoplastic polyester resins may be used.

It is preferable to use the thermoplastic polyester resin having a melting point of 130° C. to 255° C. This is because retort resistance is deteriorated when the melting point is less than 130° C., while coating of the thermoplastic polyester resin to the aluminum surface-treated sheet becomes difficult when the melting point exceeds 255° C.

The above-mentioned thermoplastic resin may be coated to the aluminum surface-treated sheet by heat adhesion after forming the film or the thermoplastic resin may be coated to the aluminum surface-treated sheet by an extrusion and lamination method in which the thermoplastic resin in a molten state by heating is extruded into a film shape through a slit having a narrow extruding width of an extruder, and the thermoplastic resin is coated to the metal sheet directly.

Coating of the film on the aluminum surface-treated sheet by way of the adhesion primer may be performed by heat adhesion of the film or the extrusion and lamination of the film after coating the surface-treated sheet with the adhesion primer or by coating the surface-treated sheet with the film by heat adhesion after coating one surface of the film with an adhesive film. In coating the surface-treated sheet with the film after forming the film, the above-mentioned film is not specifically limited, and the film may be a non-stretched film, a uniaxially stretched film or a bi-axially stretched film, for example.

(Formed Body)

In the resin-coated aluminum alloy sheet of the present invention, the organic resin film layer is firmly adhered to the aluminum alloy sheet thus exhibiting favorable corrosion resistance and a favorable surface state whereby the resin-coated aluminum alloy sheet can be also used in a planar sheet state directly. On the other hand, the resin-coated aluminum alloy sheet of the present invention exhibits extremely favorable formability and hence, various forming such as drawing, bending, flanging forming, stamping and the like can be suitably applied to the resin-coated aluminum alloy sheet. Accordingly, it is possible to obtain various kinds of formed bodies having complicated shapes such as vessels, can materials, lids for vessels, electronic appliances, office work products, toys, furniture, roof materials, wall materials, interior and exterior materials for vehicles, ships and the like using the resin-coated aluminum alloy sheet. In this manner, the resin-coated aluminum alloy sheet can be effectively used in various applications.

A can lid which constitutes one example of the formed boy can be formed by a known forming method such as a press forming method using the above-mentioned resin-coated aluminum alloy sheet for a can lid. With respect to lid types of the can lid, in general, the can lid is applicable to a stay-on-tab-type easy-to-open lid (SOT), a full-open-type easy-to-open lid (FOE) or a three-piece-can bottom lid such as a welded can.

For example, in case of forming the SOT or FOE, firstly, the resin-coated aluminum alloy sheet is blanked into a predetermined shape and a predetermined size. Subsequently or simultaneously with such blanking, the blanked resin-coated aluminum alloy sheet is formed into a can lid using a press mold. Next, score forming and a rivet forming for forming a partial opening are applied to an outer surface side of the can lid, and a tab for opening is mounted on the outer surface of the can lid, a peripheral portion of an opening is formed into a curl for double seaming, sealing compound is applied to an inner surface side of the curl, and is dried thus forming the can lid. Further, a bottom lid for a three-piece can such as a welded can be formed by a method which excludes a score forming step, a rivet forming step and a tab mounting step from the above-mentioned steps.

A can body which constitutes another example of the formed body can be formed by a known forming method using the above-mentioned resin-coated aluminum alloy sheet for a can body.

Firstly, the resin-coated aluminum alloy sheet is blanked into a predetermined shape and a predetermined size and, subsequently or simultaneously with such blanking, the blanked resin-coated aluminum alloy sheet is formed into a can body using a press mold.

As a forming method, a conventionally known forming method such as drawing, drawing/redrawing, drawing and ironing, bending after drawing (thinning/drawing or stretching) is applied to the resin-coated aluminum alloy sheet so as to form seamless cans having various shapes.

In case of a thermoplastic resin-coated sheet, after redrawing, stretching-by-bending and/or ironing may be performed so as to reduce a wall thickness of a side wall portion of the can body. The reduction of wall thickness is performed such that compared to a thickness of a bottom portion of the can body, a thickness of the side wall portion becomes 20 to 95%, and more particularly 30 to 90% of an original sheet thickness of the laminated plate by stretch-by-drawing and/or ironing.

With respect to the thermoplastic resin-coated sheet, the obtained can body is subject to heat treatment of at least one stage thus providing aligned crystallization to a thermoplastic resin layer of a can barrel portion, removing residual distortion generated by the previously-mentioned forming, evaporating a lubricant used in forming from a surface of the thermoplastic resin-coated sheet, or curing printed ink on the surface of the thermoplastic resin-coated sheet by drying. After such heat treatment, the can body is subject to quenching or gradual cooling. Further, when necessary, the thermoplastic resin-coated sheet is subject to neck-in forming or roll necking forming of one stage or multiple stages, and the can body is subject to flange forming thus forming a seamed can. Further, after forming a seamless can, an upper portion of the seamless can may be deformed so as to form a bottle-shaped can body.

EXAMPLE

Hereinafter, the present invention is explained more specifically in conjunction with examples. However, the present invention is not limited to these examples.

Example 1

(Preparation of Surface Treatment Liquid)

A fluoro zirconic acid, an aluminum hydroxide, a hydrofluoric acid and a polyitaconic acid ("PIA-728" (product name) made by IWATA CHEMICAL CO., LTD., molecular weight: approximately 3000) which constitutes an aluminum ion trapping agent are blended together in a state that zirconium ions amount 500 ppm, aluminum ions amount 100 ppm, effective fluorine ions amount 10 ppm, and polyitaconic acid ions amount 200 ppm respectively, and ammonium is added to the mixture so as to set the pH to 3.5 thus obtaining the metal surface treatment composition.

(Surface Treatment)

Degreasing treatment is performed by immersing a commercially available aluminum-manganese alloy sheet (kind: JIS A3004, sheet thickness: 0.28 mm, sheet size: 200×300 mm) into 2% aqueous solution (65° C.) of degreasing agent "SCL420N-2" (product name) made by Nippon Paint Co., Ltd. for 7 seconds. After the degreasing treatment is performed, the aluminum-manganese alloy sheet is cleaned with water and, thereafter, the acid cleaning is performed by immersing the aluminum-manganese alloy sheet into 2% aqueous solution (50° C.) of sulfuric acid for 3 seconds. After the acid cleaning is performed, the aluminum-manganese alloy sheet is cleaned with water and, thereafter, spray treatment is performed to the aluminum-manganese alloy sheet at 60° C. for 6 seconds using the metal surface treatment composition. Next, the aluminum-manganese alloy sheet is cleaned with water, is dehydrated using a squeezing roll and, thereafter, is dried under a condition of 80° C. for 60 seconds. Further, with respect to only an aluminum-manganese alloy sheet which is used as test pieces for evaluation of film irregularities, the aluminum-manganese alloy sheet is subject to the similar treatment using the above-mentioned metal surface treatment composition after performing a treatment of aluminum alloy at a rate of 0.1 m² per 1 L of composition, and surface treatment liquid is removed by roll squeezing. Thereafter, the aluminum-manganese alloy sheet is cleaned with water, and dehydration of aluminum-manganese alloy sheet is performed by performing roll squeezing again, and the aluminum-manganese alloy sheet is dried based on the same condition. In both cases, a zirconium quantity in the surface treatment film is 15 mg/m², and a carbon quantity in the surface treatment film is 2 mg/m².

(Measurement of Contents of Components in Surface Treatment Film)

The adhesion quantity of zirconium in the formed surface treatment film is measured using the X-ray fluorescence analyzer ("XRF1700" (product name) made by SHIMADZU CORPORATION). Further, the adhesion quantity of aluminum ion trapping agent is measured as the amount of organic carbon derived from the aluminum ion trapping agent using a total organic carbon measuring device (Multiphase Carbon and Hydrogen/Moisture Determinator "RC412" made by LECO Corporation). A disc-shaped plate having a diameter of 40 mm is used as a sample, and the measurement is performed under the condition of 450° C. for 5 minutes. A result of the measurement is shown in Table 1, 2.

(Formation of Thermoplastic-Resin-Coated Aluminum Alloy Sheet)

A copolymerized polyethylene terephthalate film containing 15 mol % of isophthalic acid and having a thickness of 16 µm which constitutes a film for forming an inner side of a can and a copolymerized polyethylene terephthalate film containing 15 mol % of isophthalic acid and having a thickness of 16 µm which constitutes a film for forming an outer side of the can are extruded from a T die of a molten resin extruder to a cooling roll and cooled thus producing the film for inside of a can and the film for outside of a can. The surface-treated aluminum alloy sheet is heated up to 230° C., and is clamped by a pair of lamination rolls whose temperature is set at 150° C. The above-mentioned films are thermally laminated to the surface-treated aluminum alloy sheet at a sheet feeding speed of 150 m/min and, thereafter, the surface-treated aluminum alloy sheet is immediately cooled with water. In such a manner, a can body material formed by the aluminum alloy sheet having the inner surface and the outer surface thereof coated with polyester resin is obtained.

(Preparation of Can Body)

The resin-coated aluminum alloy sheet as the can body material is formed into a disc shape having a diameter of 166 mm by blanking in the direction that a resin-coated surface is provided to a can-body surface to be evaluated and shown below, and is formed into a shallow-drawn cup by drawing. Then, the shallow-drawn cup is formed into a cup by redrawing after ironing. Various characteristics of this cup are as follows.

Can-body diameter: 66 mm
Can-body height: 128 mm
Average sheet thickness reduction rate of side wall portion of can relative to original sheet thickness: 63%

The can body is formed by doming using an ordinary method, is subject to heat treatment at a temperature of 220° C. and, thereafter, is gradually cooled. After cooling, trimming is performed on an opening end peripheral portion so as to set a cup height at a fixed value. Thereafter, printing on an outer surface of a can barrel and baking and drying of printing, neck-forming and flange-forming are performed thus producing a seamless can body having a capacity of 350 ml. No problem arises in forming the seamless can body. Then, the can body is evaluated as follows.

(Evaluation)
(Film Irregularities (Sludge))

The film irregularities of the above-mentioned surface-treated aluminum alloy sheet are observed with naked eyes. It is found that when the metal surface treatment composition liquid contains a large quantity of sludge, the surface irregularities occur. The followings are set as evaluation criteria of film irregularities. Ranges where surface-treated aluminum alloy sheets can be used for manufacturing products are indicated by "Good" and "Fair". The result is shown in Table 1.

Good: no film irregularities
Fair: minute quantity of film irregularities present
Bad: irregularities present (Resistance Against Delamination with Flaws)

A flaw line which reaches a metal surface is formed on an inner surface of a smallest diameter portion of a neck portion of a manufactured can body in the circumferential direction by a cutter and, thereafter, the can body is filled with distilled water, and a can lid is seamed to the can body. Thereafter, a retort treatment is applied to the can at a temperature of 130° C. for 30 minutes. After returning the temperature of the distilled-water filled can to a room temperature, the presence or the non-presence of peeling-off of an inner surface film at a flaw-formed portion is evaluated with naked eyes. The followings are set as evaluation criteria of resistance against delamination with flaws. Ranges where the can bodies can be used as products are indicated by "Good" and "Fair". The result is shown in Table 1.

Good: Peel-off width from flaw line 1.0 mm
Fair: 1.0 mm<Peel-off width from flaw line 3.0 mm
Bad: 3.0 mm<Peel-off width from flaw line (Impact Resistance Adhesiveness)

The manufactured can body is filled with carbonated water, and a lid is seamed to the can body. The seamed can is stored at a temperature of 37° C. for two weeks and, thereafter, is stored at a temperature of 5° C. for two days. Then, the can body is left at rest in a horizontal posture with a temperature kept at 5° C. Then, the can body is deformed by an impact. That is, to deform the can body by the impact, a weight which weighs 1 kg and has a spherical surface with a diameter of 65.5 mm is dropped from the height of 40 mm onto an upper surface portion of the can body such that the spherical surface of the weight hits the can. Thereafter, the can is opened. Then, the electric conduction of a portion of the can body deformed by the impact is measured, and the impact resistance of the can is evaluated. The electric conduction measurement is performed as follows. A sponge containing 1% of NaCl solution is brought into contact with a portion deformed by the impact, a voltage of 6. OV is applied between an electrode (cathode electrode) in the inside of the sponge and the can body, and a current which flows between the electrode and the can body is measured. The followings are set as evaluation criteria of impact resistance adhesiveness. Ranges where the can body can be used as products are indicated by "Good". The result is shown in Table 1.
Good: average current value≤0.1 mA
Bad: average current value>0.1 mA
(Pack Test 1)

The manufactured can body is filled with 350 g of Coca-Cola (trademark) as a content, and a lid is seamed to the can body in accordance with an ordinary method. The can body is stored at a temperature of 37° C. for three months in a posture with the lid on the top. Thereafter, a seamed portion is cut off using a can opener, and the lid is separated from the can barrel. Then, a corroded state of an inner surface of the can barrel is observed using a microscope, and the corrosion resistance of the can body is evaluated. The pack test 1 is carried out with the number of samples being set to n=50. The evaluation result is described in Table 1. Ranges where the can body can be used as products are indicated by "no abnormality".
(Pack Test 2)

The manufactured can body is filled with 350 g of HiLiki lemon (trademark) as a content, and a lid is seamed to the can body in accordance with an ordinary method. The can body is stored at a temperature of 37° C. for three months in a posture with the lid on the top and, thereafter, is stored at a temperature of 5° C. for two days. Then, the can body is left at rest in a horizontal posture with a temperature kept at 5° C. Then, the can body is deformed by an impact. That is, to deform the can body by the impact, a weight which weighs lkg and has a spherical surface with a diameter of 65.5 mm is dropped from the height of 40 mm onto an upper surface portion of the can body such that the spherical surface of the weight hits the can. Further, the can body is stored at a temperature of 37° C. for three months in an upright posture. Thereafter, a seamed portion is cut off using a can opener, and the lid is separated from the can barrel. Then, a corroded state of a deformed portion of an inner surface of the can barrel formed by an impact is observed using a microscope, and the corrosion resistance of the can body is evaluated. The pack test 2 is carried out with the number of samples being set to n=50. The evaluation result is described in Table 1. Ranges where the can body can be used as products are indicated by "no abnormality".

The evaluation results of the example 1 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using a phosphoric acid chromate treatment agent.

Example 2

Can bodies are prepared in the same manner as the example 1 except for that the concentration of the surface treatment composition is changed such that the surface treatment composition contains 10000 ppm of zirconium ions, 2000 ppm of aluminum ions, 200 ppm of effective fluorine ions and 50 ppm of polyitaconic acid, and zirconium quantity and carbon quantity of the surface treatment film are set to 100 mg/m$^2$ and 0.5 mg/m$^2$ respectively. Then, the evaluation of properties of the can bodies is performed. The evaluation results of the example 2 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Example 3

Can bodies are prepared in the same manner as the example 1 except for that the concentration of the surface treatment composition is changed such that the surface treatment composition contains 10000 ppm of zirconium ions, 2000 ppm of aluminum ions, 200 ppm of effective fluorine ions and 10000 ppm of polyitaconic acid, and zirconium quantity and carbon quantity of the surface treatment film are set to 100 mg/m$^2$ and 20 mg/m$^2$ respectively. Then, the evaluation of properties of the can bodies is performed. The evaluation results of the example 3 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Example 4

Can bodies are prepared in the same manner as the example 1 except for that the concentration of the surface treatment composition is changed such that the surface treatment composition contains 10000 ppm of zirconium ions, 2000 ppm of aluminum ions, 1000 ppm of effective fluorine ions and 120 ppm of polyitaconic acid, the treatment temperature is 30° C., the treatment time is 1 second and zirconium quantity and carbon quantity of the surface treatment film are set to 2 mg/m$^2$ and 0.3 mg/m$^2$ respectively. Then, the evaluation of properties of the can bodies is performed. The evaluation results of the example 4 are favorable with respect to film irregularities, impact resistance adhesiveness, pack test 1 and pack test 2. Although the resistance against delamination with flaws is not sufficient, the resistance against delamination with flaws is within an allowable range. That is, the can bodies exhibit performances substantially equal to or more than corresponding performances of conventional can bodies manufactured using phosphoric acid chromate treatment agent.

Example 5

Can bodies are prepared in the same manner as the example 1 except for that the concentration of the surface treatment composition is changed such that the surface treatment composition contains 10000 ppm of zirconium ions, 2000 ppm of aluminum ions, 1000 ppm of effective fluorine ions and 200 ppm of polyitaconic acid, the treatment temperature is 30° C., the treatment time is 1 second and zirconium quantity and carbon quantity of the surface treatment film are set to 2 mg/m$^2$ and 0.5 mg/m$^2$ respectively. Then, the evaluation of properties of the can bodies is performed. The evaluation results of the example 5 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Example 6

Can bodies are prepared in the same manner as the example 1 except for that the concentration of the surface treatment composition is changed such that the surface treatment composition contains 10000 ppm of zirconium ions, 2000 ppm of aluminum ions, 1000 ppm of effective fluorine ions and 10000 ppm of polyitaconic acid, the treatment temperature is 30° C., the treatment time is 1 second and zirconium quantity and carbon quantity of the surface treatment film are set to 2 mg/m$^2$ and 20 mg/m$^2$ respectively. Then, the evaluation of properties of the can bodies is performed. The evaluation results of the example 6 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Example 7

Can bodies are prepared in the same manner as the example 1 except for that the concentration of the surface treatment composition is changed such that the surface treatment composition contains 10000 ppm of zirconium ions, 2000 ppm of aluminum ions, 1000 ppm of effective fluorine ions and 11000 ppm of polyitaconic acid, the treatment temperature is 30° C., the treatment time is 1 second and zirconium quantity and carbon quantity of the surface treatment film are set to 2 mg/m$^2$ and 22 mg/m$^2$ respectively. Then, the evaluation of properties of the can bodies is performed. The evaluation results of the example 7 are favorable with respect to film irregularities, impact resistance adhesiveness, pack test 1 and pack test 2. Although the resistance against delamination with flaws is not sufficient, the resistance against delamination with flaws is within an allowable range. That is, the can bodies exhibit performances substantially equal to or more than corresponding performances of conventional can bodies manufactured using phosphoric acid chromate treatment agent.

Examples 8, 9, 10

Can bodies are prepared in the same manner as the examples 1, 3, 5 except for that D-sorbitol ("sorbit" (product made) made by Towa Chemical Industry Co., Ltd.) which is monosaccharide alcohol is used in place of poly itacolic acid as an aluminum ion trapping agent. Then, the evaluation of properties of the can bodies is performed. The evaluation results of the examples 8, 9, 10 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Examples 11, 12, 13

Can bodies are prepared in the same manner as the examples 1, 3, 5 except for that multitol ("AMAMIR" (product made) made by Towa Chemical Industry Co., Ltd.) which is disaccharide alcohol is used in place of poly itacolic acid as an aluminum ion trapping agent. Then, the evaluation of properties of the can bodies is performed. The evaluation results of the examples 11, 12, 13 are favorable with respect to all of film irregularities, resistance against delamination with flaws, impact resistance adhesiveness, pack test 1 and pack test 2. That is, the can bodies exhibit performances substantially equal to or more than corresponding performances of conventional can bodies manufactured using phosphoric acid chromate treatment agent.

Comparison Example 1

Can bodies are prepared in the same manner as the example 1 except for that the concentration of the surface treatment composition is changed such that the surface treatment composition contains 13000 ppm of zirconium ions, 2600 ppm of aluminum ions, 260 ppm of effective fluorine ions and 10 ppm of polyitaconic acid, and zirconium quantity and carbon quantity of the surface treatment film are set to 110 mg/m$^2$ and 0.5 mg/m$^2$ respectively. Then, the evaluation of properties of the can bodies is performed. The comparison example 1 exhibits favorable evaluation results with respect to the pack test 1. However, the comparison example 1 exhibits unfavorable evaluation results with respect to resistance against delamination with flaws, impact resistance adhesiveness and pack test 2. Minute quantity of film irregularities are found with respect to film irregularities.

Comparison Example 2

Can bodies are prepared in the same manner as the example 1 except for that the concentration of the surface treatment composition is changed such that the surface treatment composition contains 13000 ppm of zirconium ions, 2600 ppm of aluminum ions, 260 ppm of effective fluorine ions and 1500 ppm of polyitaconic acid, and zirconium quantity and carbon quantity of the surface treatment film are set to 110 mg/m$^2$ and 20 mg/m$^2$ respectively. Then, the evaluation of properties of the can bodies is performed. The comparison example 2 exhibits favorable evaluation results with respect to film irregularities and pack test 1. However, the comparison example 2 exhibits unfavorable evaluation results with respect to resistance against delamination with flaws, impact resistance adhesiveness and pack test 2.

Comparison Example 3

Can bodies are prepared in the same manner as the example 1 except for that the concentration of the surface treatment composition is changed such that the surface treatment composition contains 100 ppm of zirconium ions, 20 ppm of aluminum ions, 2 ppm of effective fluorine ions and 2500 ppm of polyitaconic acid, the treatment time is 1 second and zirconium quantity and carbon quantity of the surface treatment film are set to 1 mg/m$^2$ and 0.5 mg/m$^2$ respectively. Then, the evaluation of properties of the can bodies is performed. In the evaluation results, the comparison example 3 exhibits minute quantity of film irregularities. The comparison example 3 exhibits unfavorable evaluation results with respect to resistance against delamination with flaws, impact resistance adhesiveness, pack test 1 and pack test 2.

Comparison Example 4

Can bodies are prepared in the same manner as the example 1 except for that the concentration of the surface treatment composition is changed such that the surface treatment composition contains 100 ppm of zirconium ions, 20 ppm of aluminum ions, 2 ppm of effective fluorine ions and 10000 ppm of polyitaconic acid, the treatment time is 1 second and zirconium quantity and carbon quantity of the surface treatment film are set to 1 mg/m$^2$ and 20 mg/m$^2$ respectively. Then, the evaluation of properties of the can bodies is performed. The comparison example 4 exhibits favorable evaluation results with respect to film irregularities. However, the comparison example 4 exhibits unfavorable evaluation results with respect to resistance against delamination with flaws, impact resistance adhesiveness, pack test 1 and pack test 2.

Comparison Example 5

Can bodies are prepared in the same manner as the example 1 except for that phenol resin (concentration: 200 ppm) is used as the organic component in the surface treatment composition in place of the aluminum ion trapping agent. Then, the evaluation of properties of the can bodies is performed. The comparison example 5 exhibits favorable evaluation results with respect to resistance against delamination with flaws, impact resistance adhesiveness, pack test 1 and pack test 2. However, the comparison example 5 exhibits unfavorable evaluation results with respect to film irregularities.

Comparison Example 6

Can bodies are prepared in the same manner as the example 1 except for that tannic acid (concentration: 200 ppm) is used as the organic component in the surface treatment composition in place of the aluminum ion trapping agent. Then, the evaluation of properties of the can bodies is performed. The comparison example 6 exhibits favorable evaluation results with respect to resistance against delamination with flaws, impact resistance adhesiveness, pack test 1 and pack test 2. However, the comparison example 6 exhibits unfavorable evaluation results with respect to film irregularities.

Comparison Example 7

Can bodies are prepared in the same manner as the example 1 except for that the surface treatment composition does not contain the organic component. Then, the evaluation of properties of the can bodies is performed. In the evaluation results, the comparison example 7 exhibits minute quantity of film irregularities. The comparison example 7 exhibits unfavorable evaluation results with respect to resistance against delamination with flaws, impact resistance adhesiveness, pack test 1 and pack test 2.

Example 14

Surface-treated aluminum alloy sheet is prepared in the same manner as the example 1 except for that commercially available aluminum-manganese alloy sheet (kind: JIS A5021, sheet thickness: 0.25 mm, sheet size: 200×300 mm) is used as the aluminum alloy sheet. Then, the measurement of contents of components in the surface treatment film is performed in the same manner as the example 1. Here, zirconium quantity and carbon quantity of the surface treatment film are set to 15 mg/m$^2$ and 2 mg/m$^2$.
(Formation of Resin-Coated Aluminum Alloy Sheet)

As the resin-coated aluminum alloy sheet, a can-lid-use aluminum alloy sheet whose inner and outer surfaces are coated with resin is obtained by a following method. That is, an epoxy acrylic coating is applied to a side of the obtained surface treatment coated aluminum alloy sheet which constitutes an outer surface of the can lid using a roll coater, and coating is baked by a hot blast stove at a temperature of 180° C. for 10 minutes thus forming coating having a coating quantity of 35 mg/dm$^2$ on an outer surface of the surface treatment coated aluminum alloy sheet. Next, an epoxy acrylic coating is applied to a side of the obtained surface treatment coated aluminum alloy sheet which constitutes an inner surface of the can lid using a roll coater, and coating is baked by a hot blast stove at a temperature of 200° C. for 10 minutes thus forming coating having a coating quantity of 72 mg/dm$^2$ on an inner surface of the surface treatment coated aluminum alloy sheet.
(Formation of Can Lid)

The resin-coated aluminum alloy sheet for can lid is formed into a disc having a diameter of 68.7 mm by blanking in the direction where a surface to which an inner-side resin is applied is provided to an inner-surface side of the can lid. Then, by forming a partially-opening-type score (remaining score thickness: 110 μm, score width: 20 μm) on an outer surface side of the can lid, by riveting and attaching a tab for opening on the outer surface of the lid, by forming an opening end portion into a curl for double seaming, applying a sealing compound on an inner surface side of the curl, by drying the sealing compound, and by applying double seaming, an SOT having a lid diameter of 50.8 mm is prepared.
(Evaluation of Can Lid)

The following evaluation is made with respect to the can lid.
(Evaluation)
(Film Irregularities (Sludge))

In the same manner as the example 1, the following evaluation is made by observing film irregularities of the above-mentioned surface-treated aluminum alloy sheet with naked eyes. Ranges which allow surface-treated aluminum alloy sheets to be used for manufacturing products are indicated by "Good" and "Fair". The result is shown in Table 2.
Good: no film irregularities
Fair: minute quantity of film irregularities present
Bad: irregularities present
(Feathering Evaluation (Adhesiveness))

With respect to a can lid obtained by the above-mentioned manner, a retort sterilization treatment (130° C. for 30 minutes) is performed. Thereafter, an opening is actually formed in the can lid, and the degree of generation of feathering at an opening portion is evaluated. The feathering test is carried out with the number of samples being set to n=50. The result is evaluated as follows, and is collectively shown in Table 2. Ranges which allow the can lid to be used as products are indicated by "Good" and "Fair".
Good: an average length of feathering being less than 0.5 mm
Fair: an average length of feathering being not less than 0.5 mm and less than 1.0 mm
Bad: an average length of feathering being not less than 1.0 mm
(Openability Evaluation)

With respect to a can lid obtained by the above-mentioned manner, a retort sterilization treatment (130° C. for 30 minutes) is performed. Thereafter, an openability is evaluated. The evaluation result is described with a formula, that is, number of defective opening due to occurrence of cracks/number of opening. The evaluation result is collectively shown in Table 2. Ranges which allow the can lid to be used as a product are indicated by "the number of lids which cannot be opened: zero".

(Pack Test (Corrosion Resistance of Can Lid))

A stretch-drawn can barrel for a general-use negative-pressure can is filled with coffee with milk as a content, and a can lid obtained by the above-mentioned manner is seamed to the can body in accordance with an ordinary method. The sterilization treatment is applied to the seamed can at a temperature of 130° C. for 30 minutes. The seamed can is stored at a temperature of 37° C. for three months with the lid on the bottom and, thereafter, a seamed portion is cut off using a can opener, and the can lid is separated from the can barrel. Then, a corroded state of an inner surface of the can lid is observed using a microscope, and the corrosion resistance of the can lid is evaluated. The pack test is carried out with the number of samples being set to n=50. Ranges where the can lid can be used as a product are indicated by "no abnormality". The evaluation result is collectively shown in Table 2.

The evaluation results of the example 14 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 15

Can lids are prepared in the same manner as the example 14 except for that the concentration of the surface treatment composition is changed such that the surface treatment composition contains 10000 ppm of zirconium ions, 2000 ppm of aluminum ions, 200 ppm of effective fluorine ions and 50 ppm of polyitaconic acid, and zirconium quantity and carbon quantity of the surface treatment film are set to 100 mg/m$^2$ and 0.5 mg/m$^2$ respectively. Then, the evaluation of properties of the can lids is performed. The evaluation results of the example 15 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 16

Can lids are prepared in the same manner as the example 14 except for that the concentration of the surface treatment composition is changed such that the surface treatment composition contains 10000 ppm of zirconium ions, 2000 ppm of aluminum ions, 200 ppm of effective fluorine ions and 10000 ppm of polyitaconic acid, and zirconium quantity and carbon quantity of the surface treatment film are set to 100 mg/m$^2$ and 20 mg/m$^2$ respectively. Then, the evaluation of properties of the can lids is performed. The evaluation results of the example 16 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 17

Can lids are prepared in the same manner as the example 14 except for that the concentration of the surface treatment composition is changed such that the surface treatment composition contains 10000 ppm of zirconium ions, 2000 ppm of aluminum ions, 1000 ppm of effective fluorine ions and 120 ppm of polyitaconic acid, the treatment temperature is 30° C., the treatment time is 1 second and zirconium quantity and carbon quantity of the surface treatment film are set to 2 mg/m$^2$ and 0.3 mg/m$^2$ respectively. Then, the evaluation of properties of the can lids is performed. The evaluation results of the example 17 are favorable with respect to film irregularities (sludge) resistance, openability and pack test (corrosion resistance). Although the feathering resistance is not sufficient, the feathering resistance is within an allowable range. That is, the can lids exhibit performances substantially equal to or more than corresponding performances of conventional can lids manufactured using phosphoric acid chromate treatment agent.

Example 18

Can lids are prepared in the same manner as the example 14 except for that the concentration of the surface treatment composition is changed such that the surface treatment composition contains 10000 ppm of zirconium ions, 2000 ppm of aluminum ions, 1000 ppm of effective fluorine ions and 200 ppm of polyitaconic acid, the treatment temperature is 30° C., treatment time is 1 second and zirconium quantity and carbon quantity of the surface treatment film are set to 2 mg/m$^2$ and 0.5 mg/m$^2$ respectively. Then, the evaluation of properties of the can lids is performed. The evaluation results of the example 18 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 19

Can lids are prepared in the same manner as the example 14 except for that the concentration of the surface treatment composition is changed such that the surface treatment composition contains 10000 ppm of zirconium ions, 2000 ppm of aluminum ions, 1000 ppm of effective fluorine ions and 10000 ppm of polyitaconic acid, the treatment temperature is 30° C., the treatment time is 1 second and zirconium quantity and carbon quantity of the surface treatment film are set to 2 mg/m$^2$ and 20 mg/m$^2$ respectively. Then, the evaluation of properties of the can lids is performed. The evaluation results of the example 19 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 20

Can lids are prepared in the same manner as the example 14 except for that the concentration of the surface treatment composition is changed such that the surface treatment composition contains 10000 ppm of zirconium ions, 2000 ppm of aluminum ions, 1000 ppm of effective fluorine ions and 11000 ppm of polyitaconic acid, the treatment temperature is 30° C., the treatment time is 1 second and zirconium quantity and carbon quantity of the surface treatment film are set to 2 mg/m$^2$ and 22 mg/m$^2$ respectively. Then, the evaluation of properties of the can lids is performed. The evaluation results of the example 20 are favorable with respect to film irregularities (sludge) resistance, openability and pack test (corrosion resistance). Although the feathering resistance is not sufficient, the feathering resistance is within an allowable range. That is, the can lids exhibit performances substantially equal to or more than corresponding performances of conventional can lids manufactured using phosphoric acid chromate treatment agent.

Examples 21, 22, 23

Can lids are prepared in the same manner as the examples 14, 16, 18 except for that D-sorbitol ("sorbit" (product made) made by Towa Chemical Industry Co., Ltd.) which is monosaccharide alcohol is used in place of poly itacolic acid as an aluminum ion trapping agent. Then, the evaluation of properties of the can lids is performed. The evaluation results of the examples 21, 22, 23 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Examples 24, 25, 26

Can lids are prepared in the same manner as the examples 14, 16, 18 except for that multitol ("AMAMIR" (product made) made by Towa Chemical Industry Co., Ltd.) which is disaccharide alcohol is used in place of poly itacolic acid as an aluminum ion trapping agent. Then, the evaluation of properties of the can lids is performed. The evaluation results of the examples 24, 25, 26 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 27

Can lids are prepared in the same manner as the example 14 except for that commercially available aluminum-manganese alloy sheet (kind: JIS A5182, sheet thickness: 0.26 mm, sheet size: 200×300 mm) is used as the aluminum alloy sheet, and vinyl-organosol-based coating is applied to a side of the aluminum alloy sheet which constitutes an inner surface of the can lid with a coating quantity of 110 mg/dm$^2$, the coating is baked at a temperature of 200° C. for 10 minutes, sterilization treatment is not performed before the feathering evaluation, before the openability evaluation and in the pack test, and coca cola (trademark) is used as a content filled in the can. Then, the evaluation of properties of the can lids is performed. The evaluation results of the example 27 are favorable with respect to all of film irregularities (sludge) resistance, feathering resistance, openability and pack test (corrosion resistance). That is, the can lids exhibit performances substantially equal to or more than corresponding performances of conventional can lids manufactured using phosphoric acid chromate treatment agent.

Example 28

Easy-to-open lids (EOE) are prepared in the same manner as the example 14 except for the following. A surface treated aluminum alloy sheet is prepared using a commercially available aluminum-manganese alloy sheet (kind: JIS A5021, sheet thickness: 0.30 mm, sheet size: 200×300 mm) as the aluminum alloy sheet, an inner-surface resin-coated aluminum alloy sheet is formed by thermally laminating a biaxial stretched polyethylene terephthalate/isophthalate 11-mol % copolymer film (PET/I) having a thickness of 30 μm to the surface treated aluminum alloy sheet, wherein an epoxy-phenol-based adhesive primer having a thickness of 1 μm is applied to a can-lid-inner-surface side of the copolymer film and is dried before such lamination, and a full-open-type score (score remaining thickness: 110 μm, score width: 20 μm) is formed. The evaluation of the can lid is made in the same manner as the example 14 except for that sterilization treatment is performed at a temperature of 130° for 90 minutes before the feathering evaluation, before the openability evaluation and in the pack test, and corn soup is used as a content filled in the can. In performing the thermal lamination, the above-mentioned surface treated aluminum alloy sheet is heated at a temperature of 230° C., the surface treated aluminum alloy sheet is sandwiched by a pair of rolls with the lamination temperature held at 150° C., the surface treated aluminum alloy sheet is fed at a speed of 150 m/min, and the film is thermally adhered to the surface treated aluminum alloy sheet so as to thermally adhere the film to the surface treated aluminum alloy sheet, and the surface treated aluminum alloy sheet is cooled with water. The evaluation result of the example 28 is favorable with respect to all of film irregularities (sludge) resistance, feathering resistance, openability and pack test (corrosion resistance). That is, the easy-to-open lids exhibit performances substantially equal to or more than corresponding performances of conventional easy-to-open lids manufactured using phosphoric acid chromate treatment agent.

Comparison Example 8

Can lids are prepared in the same manner as the example 14 except for that the concentration of the surface treatment composition is changed such that the surface treatment composition contains 13000 ppm of zirconium ions, 2600 ppm of aluminum ions, 260 ppm of effective fluorine ions and 10 ppm of polyitaconic acid, and zirconium quantity and carbon quantity of the surface treatment film are set to 110 mg/m$^2$ and 0.5 mg/m$^2$ respectively. Then, the evaluation of properties of the can lids is performed. Although the comparison example 8 exhibits the favorable evaluation result with respect to openability and pack test (corrosion resistance), the comparison example 8 exhibits unfavorable evaluation result with respect to feathering resistance. Minute quantity of film irregularities are found.

Comparison Example 9

Can lids are prepared in the same manner as the example 14 except for that the concentration of the surface treatment composition is changed such that the surface treatment composition contains 13000 ppm of zirconium ions, 2600 ppm of aluminum ions, 260 ppm of effective fluorine ions and 1500 ppm of polyitaconic acid, and zirconium quantity and carbon quantity of the surface treatment film are set to 110 mg/m$^2$ and 20 mg/m$^2$ respectively. Then, the evaluation of properties of the can lids is performed. Although the comparison example 9 exhibits the favorable evaluation result with respect to film irregularities (sludge) resistance, openability and pack test (corrosion resistance), the comparison example 9 exhibits the unfavorable evaluation result with respect to feathering resistance.

Comparison Example 10

Can lids are prepared in the same manner as the example 14 except for that the concentration of the surface treatment composition is changed such that the surface treatment composition contains 100 ppm of zirconium ions, 20 ppm of aluminum ions, 2 ppm of effective fluorine ions and 2500 ppm of polyitaconic acid, the treatment time is 1 second and zirconium quantity and carbon quantity of the surface treatment film are set to 1 mg/m$^2$ and 0.5 mg/m$^2$ respectively. Then, the evaluation of properties of the can lids is performed. The comparison example 10 exhibits unfavorable evaluation result with respect to feathering resistance, openability, pack test (corrosion resistance). Minute quantity of film irregularities are found.

Comparison Example 11

Can lids are prepared in the same manner as the example 14 except for that the concentration of the surface treatment composition is changed such that the surface treatment composition contains 100 ppm of zirconium ions, 20 ppm of aluminum ions, 2 ppm of effective fluorine ions and 10000 ppm of polyitaconic acid, the treatment time is 1 second and zirconium quantity and carbon quantity of the surface treatment film are set to 1 mg/m$^2$ and 20 mg/m$^2$ respectively. Then, the evaluation of properties of the can lids is performed. Although the comparison example 11 exhibits the favorable evaluation result with respect to film irregularities (sludge) resistance, the comparison example 11 exhibits the unfavorable evaluation results with respect to feathering resistance, openability and pack test (corrosion resistance).

Comparison Example 12

Can lids are prepared in the same manner as the example 14 except for that phenol resin (concentration: 200 ppm) is used in place of the aluminum ion trapping agent as the organic component in the surface treatment composition. Then, the evaluation of properties of the can lids is performed. Although the comparison example 12 exhibits the favorable evaluation result with respect to feathering resistance, openability and pack test (corrosion resistance), the comparison example 12 exhibits the unfavorable evaluation result with respect to film irregularities (sludge) resistance.

Comparison Example 13

Can lids are prepared in the same manner as the example 14 except for that a tannic acid (concentration: 200 ppm) is used in place of the aluminum ion trapping agent as the organic component in the surface treatment composition. Then, the evaluation of properties of the can lids is performed. Although the comparison example 13 exhibits the favorable evaluation result with respect to feathering resistance, openability and pack test (corrosion resistance), the comparison example 13 exhibits the unfavorable evaluation result with respect to film irregularities (sludge) resistance.

Comparison Example 14

Can lids are prepared in the same manner as the example 14 except for that the surface treatment composition does not contain the organic component. Then, the evaluation of properties of the can lids is performed. The comparison example 14 exhibits the unfavorable evaluation result with respect to all of feathering resistance, openability and pack test (corrosion resistance). A minute quantity of film irregularities is found.

As described above, the can bodies and the can lids formed of the resin-coated aluminum alloy sheets obtained by the examples sufficiently satisfy properties including adhesiveness, corrosion resistance which are requisites for the cans and can lids. Further, these can bodies and the can lids exhibit the excellent performances substantially equal to or more than corresponding performances of conventional can bodies and can lids manufactured using phosphoric acid chromate treatment agent.

TABLE 1

| Can body | | aluminum ion trapping agent | Zr quantity | C quantity | film irregularities (sludge) | resistance against delamination with flaws | impact resistance adhesiveness | pack Test 1 | pack Test 2 |
|---|---|---|---|---|---|---|---|---|---|
| example | 1 | polyitaconic acid | 15 | 2 | Good | Good | Good | no abnormality | no abnormality |
| | 2 | polyitaconic acid | 100 | 0.5 | Good | Good | Good | no abnormality | no abnormality |
| | 3 | polyitaconic acid | 100 | 20 | Good | Good | Good | no abnormality | no abnormality |
| | 4 | polyitaconic acid | 2 | 0.3 | Good | Fair | Good | no abnormality | no abnormality |
| | 5 | polyitaconic acid | 2 | 0.5 | Good | Good | Good | no abnormality | no abnormality |
| | 6 | polyitaconic acid | 2 | 20 | Good | Good | Good | no abnormality | no abnormality |
| | 7 | polyitaconic acid | 2 | 22 | Good | Fair | Good | no abnormality | no abnormality |
| | 8 | D-sorbitol | 15 | 2 | Good | Good | Good | no abnormality | no abnormality |
| | 9 | D-sorbitol | 100 | 20 | Good | Good | Good | no abnormality | no abnormality |
| | 10 | D-sorbitol | 2 | 0.5 | Good | Good | Good | no abnormality | no abnormality |
| | 11 | maltitol | 15 | 2 | Good | Good | Good | no abnormality | no abnormality |
| | 12 | maltitol | 100 | 20 | Good | Good | Good | no abnormality | no abnormality |

TABLE 1-continued

| | Can body | | Chemical conversion treatment film | | | Evaluation | | | | |
|---|---|---|---|---|---|---|---|---|---|---|
| | | aluminum ion trapping agent | Zr quantity | C quantity | film irregularities (sludge) | resistance against delamination with flaws | impact resistance adhesiveness | pack Test 1 | pack Test 2 |
| | 13 | maltitol | 2 | 0.5 | Good | Good | Good | no abnormality | no abnormality |
| comparison example | 1 | polyitaconic acid | 110 | 0.5 | Fair | Bad | Bad | no abnormality | corrosion on impact deformation portion |
| | 2 | polyitaconic acid | 110 | 20 | Good | Bad | Bad | no abnormality | corrosion on impact deformation portion |
| | 3 | polyitaconic acid | 1 | 0.5 | Fair | Bad | Bad | corrosion on neck-in portion, seamed portion | corrosion on impact deformation portion |
| | 4 | polyitaconic acid | 1 | 20 | Good | Bad | Bad | corrosion on neck-in portion, seamed portion | corrosion on impact deformation portion |
| | 5 | phenol resin | 15 | 2 | Bad | Good | Good | no abnormality | no abnormality |
| | 6 | tannic acid | 15 | 2 | Bad | Good | Good | no abnormality | no abnormality |
| | 7 | no aluminum ion trapping agent | 15 | 0 | Fair | Bad | Bad | corrosion on neck-in portion, seamed portion | corrosion on impact deformation portion |

TABLE 2

| | <Can lid> | Chemical conversion treatment | | | | | | Evaluation | | | |
|---|---|---|---|---|---|---|---|---|---|---|---|
| | | Aluminum ion trapping agent | Zr quantity | C quantity | Lid type | Primer | Inner surface coating material | Film irregularities (sludge) | Feathering evaluation | Openability evaluation | Pack test |
| example | 14 | polyitaconic acid | 15 | 2 | SOT | no primer | epoxy acryl | Good | Good | 0/200 | no abnormality |
| | 15 | polyitaconic acid | 100 | 0.5 | SOT | no primer | epoxy acryl | Good | Good | 0/200 | no abnormality |
| | 16 | polyitaconic acid | 100 | 20 | SOT | no primer | epoxy acryl | Good | Good | 0/200 | no abnormality |
| | 17 | polyitaconic acid | 2 | 0.3 | SOT | no primer | epoxy acryl | Good | Fair | 0/200 | no abnormality |
| | 18 | polyitaconic acid | 2 | 0.5 | SOT | no primer | epoxy acryl | Good | Good | 0/200 | no abnormality |
| | 19 | polyitaconic acid | 2 | 20 | SOT | no primer | epoxy acryl | Good | Good | 0/200 | no abnormality |
| | 20 | polyitaconic acid | 2 | 22 | SOT | no primer | epoxy acryl | Good | Fair | 0/200 | no abnormality |
| | 21 | D-sorbitol | 15 | 2 | SOT | no primer | epoxy acryl | Good | Good | 0/200 | no abnormality |
| | 22 | D-sorbitol | 100 | 20 | SOT | no primer | epoxy acryl | Good | Good | 0/200 | no abnormality |
| | 23 | D-sorbitol | 2 | 0.5 | SOT | no primer | epoxy acryl | Good | Good | 0/200 | no abnormality |
| | 24 | maltitol | 15 | 2 | SOT | no primer | epoxy acryl | Good | Good | 0/200 | no abnormality |
| | 25 | maltitol | 100 | 20 | SOT | no primer | epoxy acryl | Good | Good | 0/200 | no abnormality |
| | 26 | maltitol | 2 | 0.5 | SOT | no primer | epoxy acryl | Good | Good | 0/200 | no abnormality |
| | 27 | polyitaconic acid | 15 | 2 | SOT | no primer | vinyl organosol | Good | Good | 0/200 | no abnormality |
| | 28 | polyitaconic acid | 15 | 2 | EOE | epoxy phenol | PET/1 | Good | Good | 0/200 | no abnormality |

TABLE 2-continued

| <Can lid> | | Chemical conversion treatment | | | | | Evaluation | | | |
|---|---|---|---|---|---|---|---|---|---|---|
| | | Aluminum ion trapping agent | Zr quantity | C quantity | Lid type | Primer | Inner surface coating material | Film irregularities (sludge) | Feathering evaluation | Openability evaluation | Pack test |
| comparison example | 8 | polyitaconic acid | 110 | 0.5 | SOT | no primer | epoxy acryl | Fair | Bad | 0/200 | no abnormality |
| | 9 | polyitaconic acid | 110 | 20 | SOT | no primer | epoxy acryl | Good | Bad | 0/200 | no abnormality |
| | 10 | polyitaconic acid | 1 | 0.5 | SOT | no primer | epoxy acryl | Fair | Bad | 10/200 | corrosion on rivet/score portion |
| | 11 | polyitaconic acid | 1 | 20 | SOT | no primer | epoxy acryl | Good | Bad | 2/200 | corrosion on rivet/score portion |
| | 12 | phenol resin | 15 | 2 | SOT | no primer | epoxy acryl | Bad | Good | 0/200 | no abnormality |
| | 13 | tannic acid | 15 | 2 | SOT | no primer | epoxy acryl | Bad | Good | 0/200 | no abnormality |
| | 14 | no aluminum ion trapping agent | 15 | 0 | SOT | no primer | epoxy acryl | Fair | Bad | 48/200 | corrosion on rivet/score portion |

INDUSTRIAL APPLICABILITY

The present invention provides a resin-coated aluminum alloy sheet and formed bodies thereof which can be used for forming can bodies or can lids of beverage cans, wherein a surface treatment layer is formed without using chromium, and the resin-coated aluminum alloy sheet exhibits excellent adhesiveness between the aluminum substrate and the coating film or the thermoplastic resin and excellent corrosion resistance even when the resin-coated aluminum alloy sheet is subject to severe forming. In this manner, the industrial applicability of the present invention is extremely broad.

The invention claimed is:

1. A resin coated aluminum alloy sheet comprising
an aluminum substrate having a chromium-free surface treatment film on at least one surface thereof, and
an organic resin film layer formed over the surface of the aluminum substrate over the surface treatment film,
wherein the surface treatment film has a thickness of 1-100 nm,
wherein the surface treatment film includes 0.5-20mg/m$^2$ of polyitaconic acid in terms of organic carbon content, the polyitaconic acid being a homopolymer, the surface treatment film including an aluminum ion trapped by at least a part of the polyitaconic acid, the polyitaconic acid having a molecular weight of 260 to 10000000,
wherein the surface treatment film includes 2mg/m$^2$-100mg/m$^2$ zirconium in terms of metal atoms, and
wherein the zirconium in the surface treatment film includes zirconium bonded to the polyitaconic acid.

2. A resin-coated aluminum alloy sheet according to claim 1, wherein the organic resin film layer is a thermoplastic resin film layer.

3. A resin-coated aluminum alloy sheet according to claim 2, wherein the thermoplastic resin film layer is a polyester film layer.

4. A seamless can which is funned using the resin-coated aluminum alloy sheet according to claim 2.

5. A resin-coated aluminum alloy sheet according to claim 1, wherein the organic resin film layer is a coating film.

6. A resin-coated aluminum alloy sheet according to claim 1, wherein the organic resin film layer is a thermoplastic resin film layer which is adhered to the surface of the aluminum substrate by way of an adhesion primer.

7. A formed body which is formed using die resin-coated aluminum alloy sheet according to claim 1.

8. A firmed body according to claim 7, wherein the formed body is a can lid.

9. A formed body according to claim 7, wherein the formed body is a can body.

10. A resin-coated aluminum alloy sheet according to claim 6, wherein the thermoplastic resin film layer is a polyester film layer.

11. A resin coated aluminum alloy sheet according to claim 1,
wherein the trapped aluminum includes aluminum ions etched from the aluminum substrate.

12. A resin coated aluminum alloy sheet according to claim 1, wherein the quantity of aluminum ions so trapped by the polyitaconic acid being sufficient to have adhesiveness for the organic resin.

13. A resin coated aluminum alloy sheet according to claim 1, wherein the quantity of aluminum ions so trapped by the polyitaconic acid being sufficient to suppress generation of aluminum sludge.

14. A resin coated aluminum alloy sheet according to claim 1, wherein the surface treatment film does not comprise an aluminum trapping agent other than polyitaconic acid.

15. A manufacturing method for a resin coated aluminum alloy sheet according to claim 1 comprising:
forming the chromium-free surface treatment film over the aluminum substrate by using a metal surface treatment composition, a content of aluminum ions in the metal surface treatment composition being not less than 10 ppm and not more than 2000 ppm, a content of zirconium ions in the metal surface treatment composition being not less than 10 ppm and not more than 10000 ppm, and a content of the polyitaconic acid as a homopolymer in the metal surface treatment composition being not less than 50 ppm and not more than 10000 ppm such that the chromium-free surface treatment film includes an aluminum ion trapped by at least a part of the polyitaconic acid, forming the organic resin film layer over the chromium-free surface treatment film.

16. A manufacturing method for a resin coated aluminum alloy sheet according to claim 15, the polyitaconic acid having a molecular weight of 260 to 1000000.

* * * * *